(12) United States Patent
Wanat et al.

(10) Patent No.: US 11,776,099 B2
(45) Date of Patent: Oct. 3, 2023

(54) IMAGE QUALITY METRIC FOR HDR IMAGES AND VIDEO

(71) Applicant: Dolby Laboratories Licensing Corporation, San Francisco, CA (US)

(72) Inventors: Robert Wanat, Sunnyvale, CA (US); Robin Atkins, Vancouver (CA); Anustup Kumar Atanu Choudhury, Campbell, CA (US); Scott Daly, Kalama, WA (US); Jaclyn Anne Pytlarz, Santa Clara, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 299 days.

(21) Appl. No.: 17/344,843

(22) Filed: Jun. 10, 2021

(65) Prior Publication Data

US 2022/0398710 A1  Dec. 15, 2022

(51) Int. Cl.
*G06T 7/00* (2017.01)
*G06T 5/00* (2006.01)
*G06T 5/50* (2006.01)

(52) U.S. Cl.
CPC ............ *G06T 7/0002* (2013.01); *G06T 5/002* (2013.01); *G06T 5/50* (2013.01); *G06T 7/97* (2017.01); *G06T 2207/10024* (2013.01); *G06T 2207/20024* (2013.01); *G06T 2207/20224* (2013.01); *G06T 2207/30168* (2013.01)

(58) Field of Classification Search
CPC ......... G06T 7/0002; G06T 5/002; G06T 5/50; G06T 7/97; G06T 2207/10024; G06T 2207/30168; G06T 7/90; H04N 17/02

USPC ........................................................ 382/100
See application file for complete search history.

(56) References Cited

PUBLICATIONS

Sugito, Y., Canham, T., Vazquez-Corral, J., & Bertalmio, M. (Nov. 2020). A Benchmark of Objective Quality Metrics for HLG-Based HDR/WCG Image Coding. In SMPTE 2020 Annual Technical Conference and Exhibition (pp. 1-18). SMPTE. (Year: 2020).*
Choudhury, A. et al. "Image quality evaluation for high dynamic range and wide color gamut applications using visual spatial processing of color differences" Wiley, Sep. 2020, pp. 1-19.
ITU-R BT. 2100 "Image Parameter Values for High Dynamic Range Television for Use in Production and International Programme Exchange" ITU, Jul. 2016.
ITU-R BT.2124-0 "Objective metric for the assessment of the potential visibility of colour differences in television" Jan. 2019.
SMPTE 2084:2014 "High Dynamic Range Electro-Optical Transfer Function of Mastering Reference Displays" Aug. 16, 2014.
Wanat, R. et al. "Spatiochromatic Model for Image Quality Prediction of High Dynamic Range and Wide Color Gamut Content" vol. 51, issue 1, Aug. 2020, pp. 1194-1197.

* cited by examiner

*Primary Examiner* — Emily C Terrell
*Assistant Examiner* — Emmanuel Silva-Avina

(57) ABSTRACT

Methods and systems for generating an image quality metric are described. A reference and a test image are first converted to the ITP color space. After calculating difference images ΔI, ΔT, and ΔP, using the color channels of the two images, the difference images are convolved with low pass filters, one for the I channel and one for the chroma channels (I or P). The image quality metric is computed as a function of the sum of squares of filtered ΔI, ΔT, and ΔP values. The chroma low-pass filter is designed to maximize matching the image quality metric with subjective results.

16 Claims, 2 Drawing Sheets

IMAGE QUALITY METRIC FOR HDR IMAGES AND VIDEO

CROSS-REFERENCE TO RELATED APPLICATIONS

Not Applicable

TECHNOLOGY

The present disclosure relates generally to images. More particularly, an embodiment of the present invention relates to a metric for computing visible differences in images and video.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the 14-15 orders of magnitude of the human visual system (HVS). In practice, the DR over which a human may simultaneously perceive an extensive breadth in intensity range may be somewhat truncated, in relation to HDR. As used herein, the terms visual dynamic range (VDR) or enhanced dynamic range (EDR) may individually or interchangeably relate to the DR that is perceivable within a scene or image by a human visual system (HVS) that includes eye movements, allowing for some light adaptation changes across the scene or image. As used herein, VDR may relate to a DR that spans 5 to 6 orders of magnitude. Thus, while perhaps somewhat narrower in relation to true scene referred HDR, VDR or EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8), For example, using gamma luminance coding, images where n≥8 (e.g., color 24-bit JPEG images) are considered images of standard dynamic range, while images where n≥10 may be considered images of enhanced dynamic range. HDR images may also be stored and distributed using high-precision (e.g., 16-bit) floating-point formats, such as the OpenEXR file format developed by Industrial Light and Magic.

Most consumer desktop displays currently support a maximum luminance of 200 to 300 $cd/m^2$ or nits. Most consumer HDTVs range from 300 to a maximum of 500 nits with new models reaching 1,000 nits ($cd/m^2$). Such conventional displays thus typify a lower dynamic range (LDR), also referred to as a standard dynamic range (SDR), in relation to HDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more).

High Dynamic Range (HDR) and Wide Color Gamut (WCG) images and video are now supported by several consumer and professional devices, ranging from smart-phones to television sets and cinema projectors. Many applications, such as image capture, image and video compression, and image and video displays require the evaluation of the quality of HDR images in a perceptually relevant manner.

In many situations, business decisions are made after optimizing the cost versus benefit of multiple options. For example, designing new display devices or compression schemes requires a good understanding of how different components affect the quality of the output image. In such situations, image quality metrics, such as peak signal to noise ratio (PSNR), are commonly used to automate this process. Media encoding 'ladder' approaches, where a video stream is available at multiple resolutions and bit rates, select from a number of key parameters such as resolution, coefficient compensation, quantization parameters, in-loop filtering, and the like, based on a measure of the quality of the decoded (reconstructed) output as compared with the original uncompressed input. Some image quality measures can be simple, such as the mean square error between the encoded and decoded images, but a trend has been to use more advanced metrics that are more perceptually relevant. As appreciated by the inventors here, improved techniques for deriving an accurate, but low-complexity, image quality metric for HDR images and video are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
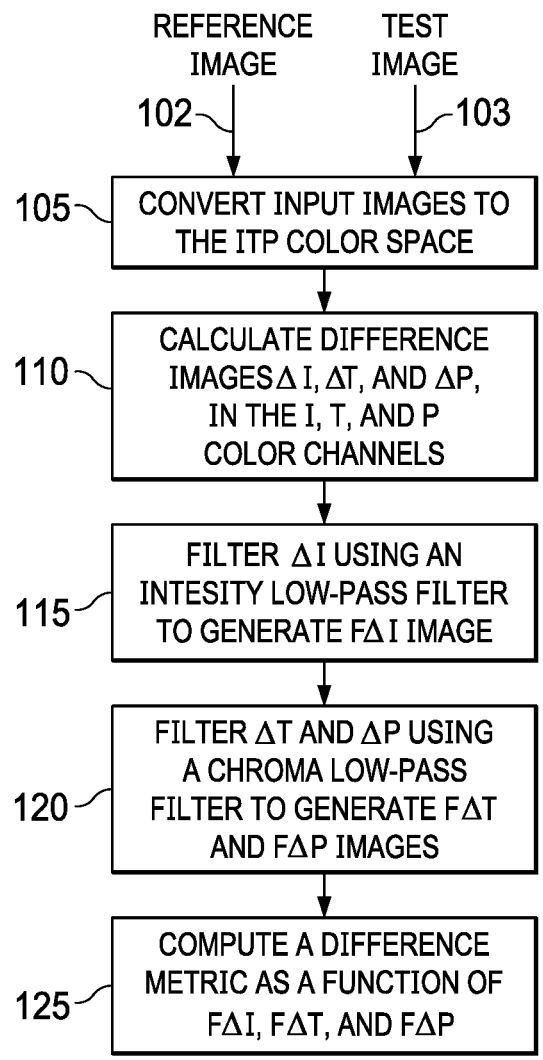
FIG. 1 depicts an example process to compute an age quality metric according to an embodiment.

Methods for an image quality metric for HDR video, images, and graphics are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

SUMMARY

Example embodiments described herein relate to an image quality metric for HDR images and video. In an embodiment, a processor receives input images comprising a reference image and a test image. If the input images are not in the ITP color space, then they are converted in the ITP color space to generate an ITP reference image and an ITP test image. Next, the processor generates difference images $\Delta I$, $\Delta T$, and $\Delta P$ by subtracting corresponding pixel values in the ITP reference image and the ITP test image for the I, T, and P color channels. The processor filters the $\Delta I$ difference image with an intensity low-pass filter to generate a filtered $\Delta I$ image (F$\Delta I$) and filters the $\Delta T$ and $\Delta P$ difference images with a chroma low-pass filter to generate filtered $\Delta T$ and $\Delta P$ images (F$\Delta T$ and F$\Delta P$). It generates sums of squared values based on corresponding pixel values of the F$\Delta I$, F$\Delta T$ and F$\Delta P$ images, and generates the image quality metric as a function of the sums of squared values (e.g., average, maximum, variance, and the like).

Color Difference Metrics

As used herein, the term 'color difference metric' refers to mathematical models that predict a measure of objective perceived differences between two color patches (or in general, groups of pixels) based on their trichromatic values, typically at a threshold level. To extend them to complex images, they require the user to compute color errors on a per-pixel basis and then consolidate these errors across the image for an overall color difference index. Consolidation usually takes the form of an average or maximum across the color difference image. The calculation of color differences is facilitated by transforming the image into a more perceptually uniform color space. Example color difference metrics include the $\Delta E_{94}$ (CIE94) and $\Delta E_{00}$ (CIEDE2000) metrics which are based on the CIF L*a*b* color space and are among the most commonly used metrics in the TV industry (Ref. [1]).

Color difference metrics are often referred to using the umbrella term $\Delta E$. For each set of two images, one reference and one distorted, one calculates the $\Delta E$ color differences on a per-pixel basis. Then, the results are averaged, for example as $$\overline{\Delta E_{metric}} = \frac{1}{N*M} \sum_{i=1}^{N} \sum_{j=1}^{M} \Delta E_{metric}(i,j), \quad (1)$$

where, for an N×M image or frame, (i,j) denotes a pixel location, for i=1, 2, ... N, and j=1, 2, ... M. Color difference metric results may be tabulated individually for each color channel in the image or they may tabulated using pixel values across all color channels.

The $\Delta E_{ITP}^S$ Metric

The proposed $\Delta E_{ITP}^S$ color difference metric can be considered as a spatio-chromatic (S) extension of the $\Delta E_{ITP}$ color difference metric, standardized in ITU-R BT.2124 and based on the ICtCp (also to be referred to as $IC_TC_P$) color space (Ref. [2]), which has been shown to work well for predicting HDR color differences using test patches under rigorous threshold test conditions. The ICtCp color space applies the PQ (see SMPTE ST 2084, Ref. [3])) transfer function to the LMS cone signal. This was motivated by the finding that a cone non-linearity model can predict the PQ (SMPTE ST 2084) non-linearity when used in a floating adaptation manner, ICtCp images can be converted into the perceptually uniform ITP color space by using the following equations:

$$I = I,$$

that is, the luminance channel remains the same, $$T = 0.5 * C_T, \quad (2)$$

$$P = C_P,$$

where the T channel (Tritanopic or blue-yellow) of ITP is obtained by scaling the $C_T$ channel of ICtCp by half, and the P channel (Protanopic, or red-green) of ITP is the same as the $C_P$ channel of ICtCp. The ITP space was optimized to improve hue linearity and small perceptual uniformity. $\Delta E_{ITP}$ is computed as $$\Delta E_{ITP} = 720 * \sqrt{\Delta I^2 + \Delta T^2 + \Delta P^2}, \quad (3)$$

where $\Delta I$, $\Delta T$, and $\Delta P$, are the differences between the reference and the distorted image for the I, T and P channels respectively. Equation (3) has the 720 scalar so that a value of 1 correlates with a visual detection threshold (Ref. [1]).

Equations (1) and (2) assume that the ICtCp signal is normalized in [0, 1]. Ct and Cp values can be shifted so that neutral (achromatic colors) are at 0. Alternatively, they can be offset so that neutrals are at 0.5. Either approach is valid because of the way the color differences are computed. One may also skip the normalization to [0, 1] by proper adjustment of the value of the 720 scaler in equation (3).

FIG. 1 depicts an example process to compute the $\Delta E_{ITP}^S$ metric according to an embodiment. As depicted in FIG. 1, input to the process are a reference image (102) and a test image (103). Without loss of generality, the test image may be the output of a design process which approximates the reference image. For example, if the reference image is compressed, scaled, or transformed, then the test image may represent the reconstructed image after decompression, inverse scaling, or inverse transformation. More generally, the test image represents a distorted version or a close approximation of the reference image.

In step 105, unless the images are already in the ITP color space, the two images are converted into the ITP color space. For example, RGB images may be first converted into the ICtCp color space according to BT. 2100 (Ref. [2]), and then converted to ITP using equation (2).

In step 110, one computes images $\Delta I$, $\Delta T$, and $\Delta P$ by taking pixel by pixel differences. For example, for color component X=I, T, or P, $$\Delta X(i,j) = X_{ref}(i,j) - X_{test}(i,j), \quad (4)$$

where $X_{ref}(i,j)$ denotes pixel (i,j) of the X color component of the reference image (102) and $X_{test}(i,j)$ denotes pixel (i,j) of the X color component of the test image (103).

In step 115, the image $\Delta I$ is filtered with an intensity low-pass filter to generate filtered image F$\Delta I$. In an embodiment, the 1D filter coefficients of a separable 2D filter are given by $$FI = [1\ 5\ 23\ 59\ 80\ 59\ 23\ 5\ 1]/256. \quad (5)$$

This represents a 9-tap low-pass filter which is applied in a separable way to both the horizontal and vertical directions of $\Delta I$. That is, rows (or columns) of $\Delta I$ are first filtered with FI to generate image F'$\Delta I$. Next, columns (or rows) of F'$\Delta I$ are filtered with FI to generate filtered image F$\Delta I$. Filter FI in equation (5) is a simplified version of the achromatic filter being used in the S-CIELAB implementation to compute $\Delta E_{00}$ (see Ref. [1]).

In an embodiment, during filtering of border pixels, the pixels outside of the picture are padded to zero; however other options known in the art may be applied with minimal effect on the overall metric.

In step 120, the two chroma delta images $\Delta T$ and $\Delta P$ are filtered with a chroma low-pass filter to generate corresponding filtered images $F\Delta T$ and $F\Delta P$. In an embodiment, the 1D filter coefficients of a separable 2D chroma low-pass filter are given by $FC=$[1 1 1 1 1 1 2 2 2 3 3 3 4 4 4 5 5 6 6 6 7 7 7 8 8 8 8 8 8 8 8 8 8 7 7 7 6 6 6 5 5 4 4 4 3 3 3 2 2 2 1 1 1 1 1 1 1]/256. (6)

This is a 59-tap low-pass filter, and the sum of coefficients is again 1.0. As the luma low-pass filter, this filter is applied in a separable way to both the horizontal and vertical directions of the input delta-chroma images.

Given the filtered chroma mages, in step 125, $\Delta E_{ITP}^S$ is computed as a function of the filtered delta images ($F\Delta I$, $F\Delta T$, and $F\Delta P$). For example, in an embodiment:

$$\Delta E_{ITP}^S = \text{average}(F\Delta I^2 + F\Delta T^2 + F\Delta P^2) == \underset{\text{all } i,j}{\text{average}}(F\Delta I(i,j)^2 + F\Delta T(i,j)^2 + F\Delta P(i,j)^2). \quad (7)$$

where average(x) is computed by averaging x values over all available x values (e.g., 3*M*N if using all three planes in an M*N image (see equation (1))).

In some embodiments, in equation (7), instead of using the average function, one may apply some other suitable function, such as a minimum, a maximum, a variance, or a standard deviation function. As in equation (3), an additional scaler may also be applied. In another embodiment, equation (7) may be rewritten in terms of a Minkowski distance, for example, for integers p>0:

$$\Delta E_{ITP}^S = S_p * (\Sigma_{i,j}|F\Delta I(i,j)|^p + \Sigma_{i,j}|F\Delta T(i,j)|^p + \Sigma_{i,j}|F\Delta P(i,j)|^p)^{1/p}, \quad (8)$$

where $S_p$ is a normalizing scaler (e.g., for p=1, $S_p$=1/(3*M*N)), p=1 defines a mean or average, p=2 corresponds to a mean square error value, and values of p between 3 to 6 have been found to work well in subjective studies.

In some embodiments, in equations (7-8), the $F\Delta T$ and $F\Delta P$ terms may be further scaled by weights so that each chroma-related term contributes less than the $F\Delta I$ term. For example, from equation (7), $$\Delta E_{ITP}^S = \text{average}(F\Delta I^2 + w_T * F\Delta T^2 + w_p * F\Delta P^2), \quad (9)$$

where $w_T$ and $w_p$ are in [0, 1].

The proposed chroma low-pass filter was designed specifically for the ITP chromaticity by following the measurements of human chromatic contrast sensitivity across a range of luminance levels applicable in HDR viewing conditions. Of the two chromatic opponency directions tested, it was decided to use the measurements of the L-M opponency because it better matches the chromaticity channels of ITP space, with both of them receiving an L-M cone opponent signal with a differential S-cone input. The measurements could be well predicted by a straight line in log-log space with a slope of −0.45.

In the original formulation of the chromatic CSF (chroma sensitivity function), the lines fitted to the experiment data across different adapting luminance levels were shifted along the sensitivity axis in accordance with Weber's law. It is assumed that the influence of luminance is already incorporated in the intensity (I) channel of ITP, which allowed to use a single filter independently of the luminance of the stimulus. In an embodiment, one can maintain the low frequency component of color differences by clamping the sensitivity to 1.0 within the filter bandwidth.

Figure 2:
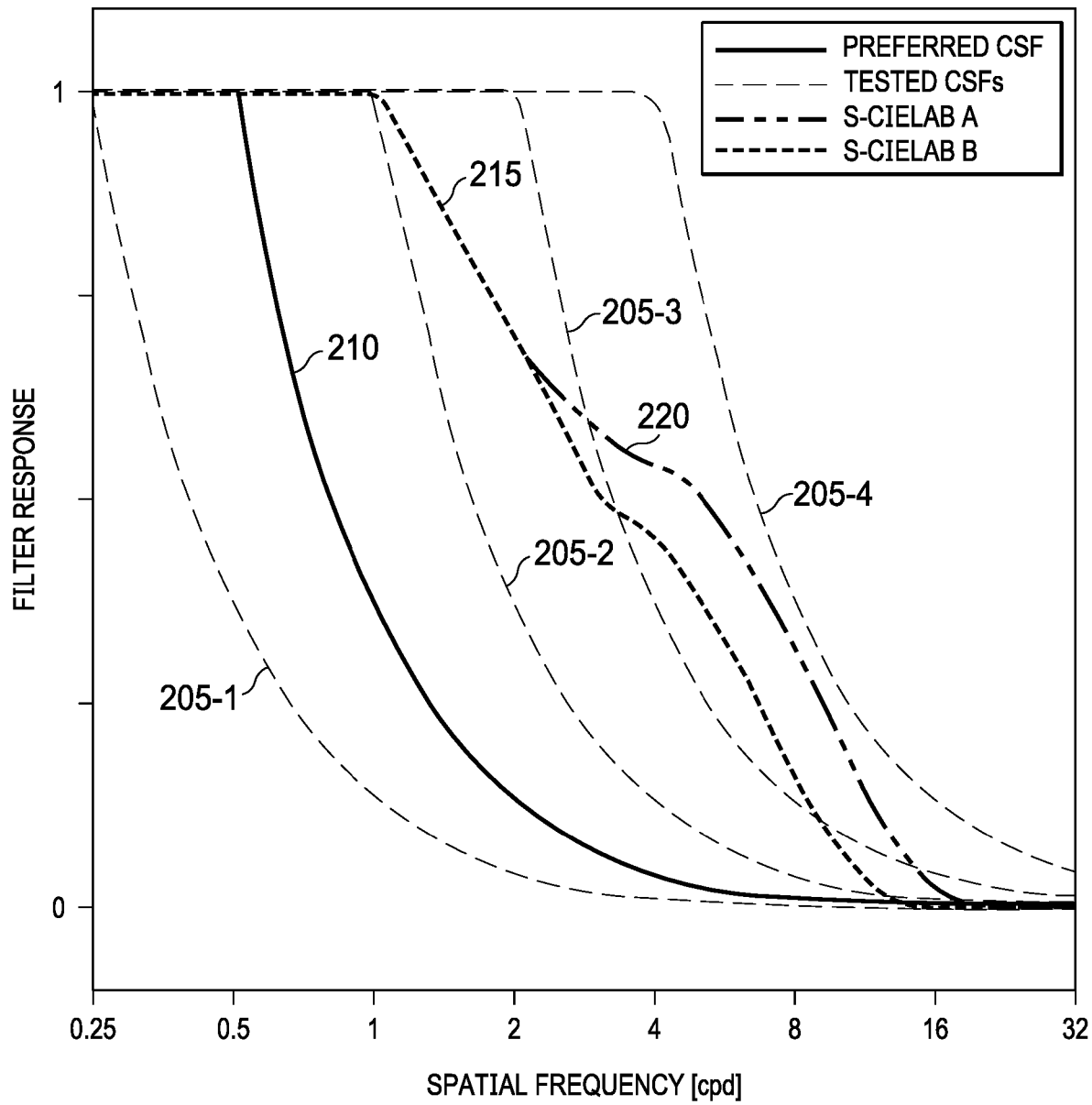
FIG. 2 depicts the frequency response of example CSF-based chromatic low-pass filters being used to compute the image quality metric according to an embodiment and according to prior art.

To select the preferred filter response (see response 210 in FIG. 2), several alternative filters were tested (e.g., 205-1, 205-2, 205-3, and 205-4) aiming to find which filter results in the highest accuracy for the HDR subjective image quality databases used for testing. For all but one database tested, the prediction accuracy was the highest when the filter response was clamped to 1 below 0.5 cycles per visual degree (cpd). The resulting chromatic CSF-based filter (210) is shown in FIG. 2 along with two S-CIELAB counterparts (215 and 220). Without loss of generality, the response of the preferred filter may be described in terms of a piecewise linear function with a response set to 1 for frequencies below 0.5 cpd, and for frequencies above 0.5 cpd decreasing from 1 to 0 at a rate of 0.45 with each doubling of frequency in the log10 domain.

In FIG. 2, the frequency responses of the filters are shown using the axes of visual cycles per degree (cpd) (in the log10 domain), which can be mapped to the pixel domain, such as cycles per pixel or cycles per radian, depending on the viewing distance and display resolution, using known in the art distance and angular size calculations.

In another embodiment, steps 115 and 120 could be reversed. That is, one can:

First, apply to both the reference image and the test image the lama and chroma low-pass CSF filters (e.g., FI and FC in equations (5) and (6)), to generate filtered images (FI, FT, FP)$_{ref}$ and (FI, FT, FP)$_{test}$. These images may be referred to as spatial ITP (S-ITP) images Next, generate the $F\Delta I$, $F\Delta P$, and $F\Delta T$ images as $F\Delta I = FI_{ref} - FI_{test}$ $F\Delta T = FT_{ref} - FT_{test}$ (10)

$F\Delta P = FP_{ref} - FP_{test}$

Finally, complete step 125.

In another embodiment, optionally, one may compute a visually relevant threshold by applying a square root function to the sum of squared $F\Delta X$ values (X=I, T, and P), as in $$\Delta E_{ITP}^S = 720 * \text{average}(\sqrt{(F\Delta I^2 + F\Delta T^2 + F\Delta P^2)}). \quad (11)$$

As discussed earlier, the average function in equation (11) may be replaced by other suitable functions, such as a minimum, a maximum, a variance, or a standard deviation function.

Compared to other image quality metrics, the proposed metric has multiple advantages, including:

1) There is no calculation of hue, as done with other metrics (e.g., those based on CIELAB, S-CIELAB, or $J_zA_zB_z$) which requires significant computation
2) The spatial filtering is defined as separable one-dimensional filters of limited extent, which are agnostic to image rotation and minimize computation
3) The result is fully differentiable through the entire space, making it useful for optimization routines such as neural networks and other encoding tools (e.g., for developing coding-ladders in streaming applications, the design of display-pixel geometries, the design of optics for head-mounted displays, and the like)

4) The estimated difference is well aligned with visual sensitivity, and thus visibility.

Despite the emphasis on using the metric in HDR and WCG gamut images, as reported by the inventors (Ref. [1]), the proposed metric may also be applicable to SDR images and video.

REFERENCES

Each of these references is incorporated by reference in its entirety.
1. A. Choudhury, et al, "Image quality evaluation for high dynamic range and wide color gamut applications using visual spatial processing of color differences." *Color Research & Application* 46.1 (2021): 46-64.
2. Rec. ITU-R, BT.2100, "Image parameter values for high dynamic range television for use in production and international programme exchange," 2018
3. ST 2084:2014—Society of Motion Picture and Television Engineers (SMPTE) Standard—High dynamic range electro-optical transfer function of mastering reference displays, SMPTE, 2014.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to an image quality metric, such as those described herein. The computer and/or IC may compute, any of a variety of parameters or values that relate to an image quality metric as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods for an image quality metric as described above by executing software instructions in a program memory accessible to the processors. The invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to an image quality metric are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for generating an image quality metric using color differences, the method comprising:
    receiving input mages comprising a reference image and a test mage;
    converting the reference image and the test image to an ITP reference image and an ITP test image in the ITP color space;
    generating difference images $\Delta I$, $\Delta T$, and $\Delta P$ by subtracting corresponding pixel values in the ITP reference image and the ITP test image for the I, T, and P color channels;
    filtering the $\Delta I$ difference image with an intensity low-pass filter to generate a filtered $\Delta I$ image (F$\Delta I$);
    filtering the $\Delta T$ and $\Delta P$ difference images with a chroma low-pass filter to generate filtered $\Delta T$ and $\Delta P$ images (F$\Delta T$ and F$\Delta P$);
    generating sums of squared values based on corresponding pixel values of the filtered $\Delta I$, $\Delta T$ and $\Delta P$ images; and
    generating the image quality metric as a function of the sums of squared values.

2. The method of claim 1, wherein converting either one of the input images to the ITP color space is skipped if the input image is already in the ITP color space.

3. The method of claim 1, wherein converting either one of the input images from the ICtCp color space to the ITP color space comprises:
    copying the I and Cp channels in the ICtCp color space to the I and P channels in the ITP color space; and
    generating T channel values in the ITP color space by dividing corresponding Ct channel values in the ICtCp color space by 2.

4. The method of claim 1, wherein generating the sums of squared values at pixel location (i,j) (s(i,j)) comprises computing $$s(i,j)=F\Delta I^2(i,j)+F\Delta T^2(i,j)+F\Delta P^2(i,j).$$

5. The method of claim 1, wherein the function of the sums of squared values comprises one of an average function, a maximum function, a variance function, or a standard deviation function.

6. The method of claim 4, wherein the image quality metric is generated based on a function of $\sqrt{s(i,j)}$ values.

7. The method of claim 1, wherein the intensity low-pass filter comprises a separable 2D filter, wherein each 1D filter comprises weights given by $FI$=[1 5 23 59 80 59 23 5 1]/256.

8. The method of claim 1, wherein the chroma low-pass filter comprises a separable 2D filter, wherein each 1D filter comprises weights given by $FC$=[1 1 1 1 1 1 2 2 2 2 3 3 3 4 4 4 5 5 6 6 6 7 7 7 8 8 8 8 8 8 8 8 8 8 8 7 7 7 6 6 6 5 5 4 4 4 3 3 3 2 2 2 2 1 1 1 1 1 1]/256.

9. The of claim 1, wherein the chroma low-pass filter comprises a frequency response characterized by a piecewise linear function with a response set to 1 for frequencies below 0.5 cycles per visual degree (cpd), and for frequencies above 0.5 cpd, decreasing from I to 0 at a rate of approximately 0.45 with each doubling of frequency in log10 domain.

10. A method for generating an image quality metric using color differences, the method comprising:
- receiving input images comprising a reference image and a test image;
- converting the reference image and the test image to an ITP reference image and an ITP test image in the ITP color space;
- filtering the intensity components of the ITP reference image and the ITP test image with an intensity low-pass filter to generate a filtered intensity reference image and a filtered intensity test image;
- filtering the T and P chroma components of the ITP reference image and the ITP test image with a chroma low-pass filter to generate filtered T and P chroma reference images and filtered T and P chroma test images;
- generating difference images F$\Delta$I, and F$\Delta$T, and F$\Delta$P by subtracting corresponding pixel values in the filtered I, and P reference images and the filtered I, T, and P reference test images;
- generating sums of squared values based on corresponding pixel values of the F$\Delta$I, F$\Delta$T, and F$\Delta$P images; and
- generating the image quality metric as a function of the sums of squared values.

11. The method of claim 10, wherein the function of the sums of squared values comprises one of an average function, a maximum function, a variance function, or a standard deviation function.

12. The method of claim 10, wherein the intensity low-pass filter comprises a separable 2D filter, wherein each 1D filter comprises weights given by $FI$=[1 5 23 59 80 59 23 5 1]/256.

13. The method of claim 10, wherein the chroma low-pass filter comprises a separable 2D filter, wherein each 1D filter comprises weights given by $FC$=[1 1 1 1 1 1 2 2 2 2 3 3 3 4 4 4 5 5 6 6 6 7 7 7 8 8 8 8 8 8 8 8 8 8 8 7 7 7 6 6 6 5 5 4 4 4 3 3 3 2 2 2 2 1 1 1 1 1 1]/256.

14. The of claim 10, wherein the chroma low-pass filter comprises a frequency response characterized by a piecewise linear function with a response set to 1 for frequencies below 0.5 cycles per visual degree (cpd), and for frequencies above 0.5 cpd, decreasing from 1 to 0 at a rate of approximately 0.45 with each doubling of frequency in log10 domain.

15. A non-transitory computer-readable storage medium having stored thereon computer-executable instructions for executing with one or more processors a method in accordance with claim 1.

16. An apparatus comprising a processor and configured to perform the method recited in claim 1.

* * * * *

UNITED STATES PATENT AND TRADEMARK OFFICE
CERTIFICATE OF CORRECTION

| | | |
|---|---|---|
| PATENT NO. | : 11,776,099 B2 | Page 1 of 1 |
| APPLICATION NO. | : 17/344843 | |
| DATED | : October 3, 2023 | |
| INVENTOR(S) | : Robert Wanat et al. | |

It is certified that error appears in the above-identified patent and that said Letters Patent is hereby corrected as shown below:

On the Title Page

Column 2 (57) Abstract, Line 7, delete "(I" and insert --(T--.

In the Claims

Column 8, Claim 1, Line 26, delete "mages" and insert --images--.

Column 8, Claim 1, Line 27, delete "mage;" and insert --image;--.

Column 9, Claim 9, Line 14, before "of", insert --method--.

Column 9, Claim 9, Line 18, delete "I" and insert --1--.

Column 10, Claim 10, Line 1, before "F$\Delta$T,", delete "and".

Column 10, Claim 10, Line 2, after "I,", insert --T,--.

Column 10, Claim 14, Line 23, before "of", insert --method--.

Signed and Sealed this
Twenty-third Day of July, 2024

Katherine Kelly Vidal
*Director of the United States Patent and Trademark Office*